United States Patent
Thoms

(10) Patent No.: US 8,244,019 B2
(45) Date of Patent: Aug. 14, 2012

(54) METHOD AND DEVICE FOR IMPROVING PERCEPTIBILITY DIFFERENT STRUCTURES ON RADIOGRAPHS

(75) Inventor: Michael Thoms, Bietigheim-Bissingen (DE)

(73) Assignee: Duerr Dental GmbH & Co. KG (DE)

( * ) Notice: Subject to any disclaimer, the term of this patent is extended or adjusted under 35 U.S.C. 154(b) by 962 days.

(21) Appl. No.: 11/658,630

(22) PCT Filed: Jul. 27, 2004

(86) PCT No.: PCT/EP2004/008370
§ 371 (c)(1),
(2), (4) Date: Sep. 25, 2008

(87) PCT Pub. No.: WO2006/010372
PCT Pub. Date: Feb. 2, 2006

(65) Prior Publication Data
US 2009/0169086 A1    Jul. 2, 2009

(51) Int. Cl.
  *G06K 9/00* (2006.01)
  *A61B 6/00* (2006.01)
(52) U.S. Cl. .............. 382/132; 382/131; 378/4; 378/5
(58) Field of Classification Search .................. 382/130, 382/132; 378/4, 5
See application file for complete search history.

(56) References Cited

U.S. PATENT DOCUMENTS 4,326,252 A * 4/1982 Kohno et al. ................... 378/14
(Continued)

FOREIGN PATENT DOCUMENTS
DE    10325632    12/2004

OTHER PUBLICATIONS

Bankman, "Section I: Enhancement"; Handbook of Medical Imaging—Processing and Analysis, XP002322709, 2000, pp. 16, 19-21.
Fisher et al., "Frequency Filter", Image Processing Learning Resources—Hypermedia Image Processing, Reference 2, XP002327102003, homepages.inf.ed.ac.uk/rbf/HIPR, 2000.

(Continued)

*Primary Examiner* — Alexander H Taningco
(74) *Attorney, Agent, or Firm* — Factor Intellectual Property Law Group, Ltd.

(57) ABSTRACT

The invention relates to a method for improving the perceptibility of different structures on radiographs by means of an image processing device consisting a) in storing a radiograph in electronic form as a local space-intensity distribution, b) in carrying out a Fourier transformation for determining a frequency-intensity distribution, c) in filtering said frequency-intensity distribution by modifying weighting between the high-frequency and low-frequency image signal components, wherein the fixing of the image signal components to be more intensively weighted is carried out taking into account the mean structure size of said structures whose perceptibility is to be improved, d) in carrying out an inverse Fourier transformation of the filtered frequency-intensity distribution in order to obtain a modified space-intensity distribution in which said structures are more easily perceptible. The image contrast for the hardly perceptible structures may be selectively improved by means of a changed weighting for the high-frequency, relative to the low-frequency, image signal components in the Fourier spectrum because the structures hardly perceptible on the radiographs, for example soft tissue parts having a size quantity and structuring different from easily perceptible structures as bones and implantants.

20 Claims, 4 Drawing Sheets

U.S. PATENT DOCUMENTS

| | | | |
|---|---|---|---|
| 4,463,375 A * | 7/1984 | Macovski | 378/98.12 |
| 4,729,100 A * | 3/1988 | Tsujii | 378/4 |
| 5,671,743 A * | 9/1997 | Kawai et al. | 600/431 |
| 5,774,599 A * | 6/1998 | Muka et al. | 382/254 |
| 6,181,810 B1 * | 1/2001 | Zhang et al. | 382/128 |
| 8,077,825 B2 * | 12/2011 | Kammerer et al. | 378/4 |
| 2001/0031076 A1 * | 10/2001 | Campanini et al. | 382/128 |
| 2003/0228065 A1 | 12/2003 | Kaltschmidt | |
| 2008/0073525 A1 * | 3/2008 | Gross et al. | 250/307 |

OTHER PUBLICATIONS

Khoral Research, "ROI Shapes", Advanced Khoros Manual, XP002322711, 1997, rab.ict.pwr.wroc.pl/khoros_root/envision/manual/Envision/E.05.extractor/HTML/shapes.html.

Madsen et al., "Enhancement of Spect Images by Fourier Filtering the Projection Image Set", Journal of Nuclear Medicine, XP001088100, Apr. 1985, vol. 26, No. 4, pp. 395-402.

International Search Report, PCT/EP2004/008370, issued Apr. 15, 2005.

* cited by examiner

METHOD AND DEVICE FOR IMPROVING PERCEPTIBILITY DIFFERENT STRUCTURES ON RADIOGRAPHS

RELATED APPLICATIONS

This application claims the filing benefit of PCT Patent Application PCT/EP2004/008370, filed Jul. 27, 2004; the contents of which are incorporated herein by reference.

TECHNICAL FIELD

The present invention relates to a method for improving the perceptibility of different structures on radiographs and to an image processing device suitable therefor.

BACKGROUND OF THE INVENTION

In medical diagnosis, it is very important to evaluate radiographs such as X-ray images. Bones, implants or similar structures generally stand out clearly from the surrounding soft tissue, and are therefore easily perceptible. On the other hand, soft tissue structures such as tendons or blood vessels are generally reproduced only very unclearly on radiographs. In many pathologies, however, it is in fact the perceptibility of the soft tissue structures which is important. Furthermore, it is often difficult to distinguish similar types of tissue from one another. Smaller bones which are imaged over a larger bone on a radiograph, for example, can often scarcely be made out with the naked eye; the same applies for soft tissue structures. In such cases, therefore, doctors can often make no diagnosis or only a very unreliable diagnosis on the basis of the radiographs.

The digitising of radiographs has provided some degree of improvement. Using known methods of image processing, such as contrast enhancement within selected image sections, soft tissue structures can for example sometimes be emphasised clearly. In general, however, a tendon lying over a bone cannot thereby be made perceptible. This is because the smaller fluctuations of the signal level of image signal components which represent the tendon do not stand out significantly from the high background signal level of the bone. Although a monitor used for the display will in the best case still reproduce the small fluctuations of the signal level as intensity fluctuations, these are usually so small that they are scarcely perceptible to the naked eye.

The present invention is directed to resolving these and other matters.

An object of the present invention is to provide a method and a device for improving the perceptibility of different types of structures on radiographs.

This object can be achieved by a method for improving the perceptibility of different structures on radiographs by using an image processing device, comprising the following steps: storing a radiograph provided in electronic form as a position-space intensity distribution; carrying out a Fourier transformation in order to determine a frequency-space intensity distribution; filtering the frequency-space intensity distribution by modifying the weighting between high-frequency and low-frequency image signal components, the image signal components to be weighted more strongly being set by taking into account an average structure size of the structures whose perceptibility is intended to be improved; and, carrying out an inverse Fourier transformation of the filtered frequency-space intensity distribution, so as to obtain a modified position-space intensity distribution in which these structures are more easily perceptible; and/or by an image processing device for improving the perceptibility of different structures on radiographs, wherein the image processing device comprises a memory (MEM) for storing a radiograph provided in electronic form as a position-space intensity distribution; a Fourier transformation unit (FT) for carrying out a Fourier transformation in order to determine a frequency-space intensity distribution; a filter (FIL) for filtering the frequency-space intensity distribution by modifying the weighting between high-frequency and low-frequency image signal components, the image signal components to be weighted more strongly being set by taking into account an average structure size of the structures whose perceptibility is intended to be improved; and, an inverse Fourier transformation unit ($FT^{-1}$) for carrying out an inverse Fourier transformation of the filtered frequency-space intensity distribution, so as to obtain a modified position-space intensity distribution in which these structures are more easily perceptible.

The invention is based on the discovery that in most cases, the structures whose perceptibility is intended to be improved differ more or less significantly in respect of their size and fineness from the other structures imaged on the radiograph. Since smaller and finer structures are manifested by higher frequencies in the Fourier spectrum than large coarse structures are, by modifying the weighting between high-frequency and low-frequency image signal components in the Fourier spectrum it is possible to enhance the image contrast either for small fine structures or for large coarse structures. Depending on whether the poorly perceptible structures are finer or coarser than the easily perceptible structures, the weighting of the image signal components in the frequency space will be modified in favour of either the high-frequency or the low-frequency image signal components.

The structures, which are poorly perceptible at first, are made to stand out clearly in particular when the image signal components to be weighted are set in that the period lengths corresponding to these frequencies are approximately twice as great as the average structure size of the structures whose perceptibility is intended to be improved.

In one particularly simple filtering embodiment of the present invention, e.g., in which the filtered frequency-space intensity distribution $F'(f_x, f_y)$ is given by: $F'(f_x, f_y)=T_F(f_x, f_y) \cdot F(f_x, f_y)$—where $F(f_x, f_y)$ is the frequency-space intensity distribution for the position-space intensity distribution, $f_x$, $f_y$ are frequencies in the two-dimensional frequency space and $T_F(f_x, f_y)$ is a filter function for the weighting of image signal components—the frequency-space intensity distribution is merely multiplied by a filter function.

By using central frequency values and profile functions for setting the frequency ranges to be weighted, the filtering can be expediently controlled with relatively few parameters in which the filter function is set by at least one central frequency value and at least one profile function, which modifies the weighting of the image signal components as a function of the distance from the central frequency value; or in which the filter function is set by at least one central frequency value and at least one profile function, which modifies the weighting of the image signal components as a function of the distance from the central frequency value.

In another aspect of the present invention, a Gaussian function is particularly suitable as a profile function, since it has the property of remaining a Gaussian function even after the inverse Fourier transformation. The filtering can then be represented in the position space as a convolution of the intensity distribution with a Gaussian function. This prevents the filtering from leading to divergence of positions in the image where the intensity distribution changes abruptly, and which therefore have a particularly high contrast.

The frequencies or frequency ranges, which have their weighting modified, are determined according to the average structure size of the structures whose perceptibility is intended to be improved. The average structure size or corresponding frequency ranges may either be fixed in advance or, freely selectable with the aid of control elements on the image processing device or via a user interface of a superordinate computer. By modifying the crucial filter parameters, a treating doctor can therefore expediently improve the perceptibility of structures in which they are interested on a very wide variety of radiographs.

Furthermore, automatic determination of the frequency ranges via an adaptive method is also feasible wherein after an operator has selected a structure whose perceptibility is intended to be improved on the radiograph, the at least one central frequency value and the at least one profile function are set adaptively so that the contrast of this structure is increased.

The structures whose perceptibility is intended to be improved may, for example, be selected by specifying a point on the boundary of the structure and a direction, along which the contrast is intended to be increased; or by specifying two points within the structure, between which the contrast is intended to be increased.

In a further embodiment of the present invention, additional high-frequency filtering in which the frequency-space intensity distribution $F(f_x, f_y)$ is also subjected to high-frequency filtering—for example in which the high-frequency filter is given by a Gaussian filter with the central frequency value 0 leads to an increase in the signal-to-noise ratio since image signal components reflecting image structures become enhanced relative to high-frequency background noise. Such filtering compensates for the fact that the Fourier amplitudes decrease with an increasing frequency f in the images often to be represented in practice.

The advantageous configurations and advantages mentioned above in respect of the method also apply accordingly for the image processing device according to the invention.

Other features and advantages of the invention will be found in the following description of an exemplary embodiment with the aid of the drawing, in which:

DETAILED DESCRIPTION OF THE PRESENT INVENTION

Figure 1:
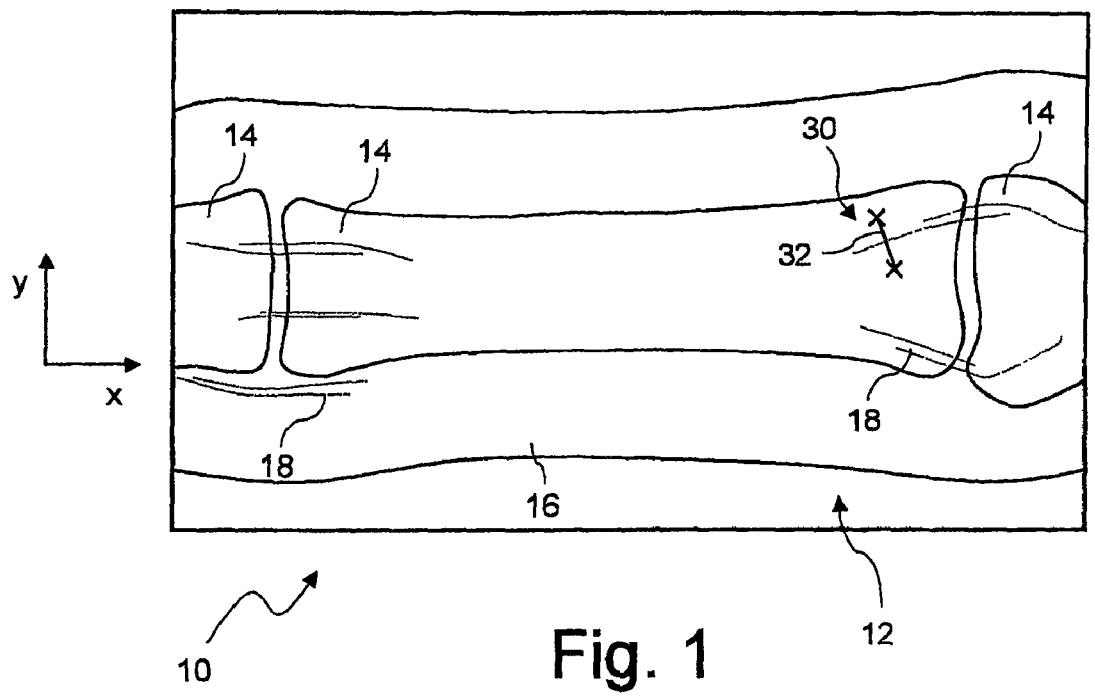
FIG. 1 shows an X-ray image on which a finger bone and soft tissue structures can be seen.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a typical X-ray image 10 of a finger 12, on which several finger bones 14 and soft tissue 16 around them can be seen. Owing to their high density compared with the soft tissue 16, the finger bones 14 stand out therefrom with a high contrast, whereas soft tissue structures such as tendons 18 are scarcely perceptible on the X-ray image 10. Diagnosing such structures of the soft tissue 16 with the aid of the X-ray image 10 therefore suffers from quite significant unreliability.

Even when the conventionally recorded X-ray image 10 is digitised in a scanner and represented on a monitor with high contrast, the soft tissue structures 18 remain difficult to see. The reason for this is that the image signal components which reflect the finger bones 14, or other hard tissue of high density, have a very high signal level. Minor fluctuations in the signal level, which represent the soft tissue structures 18 of interest, scarcely have any impact in relation to the high signal levels of the finger bones 14. Although a high-quality monitor can sometimes still reproduce minor fluctuations in the signal level as intensity fluctuations, these are nevertheless so small that they are scarcely perceptible to the naked eye. The same moreover applies for PSL image plates (PSL=photostimulatable luminescence) which are not chemically developed, rather in which the X-ray image latently contained therein must be read out via an optomechanical scanning process before observation on a monitor.

Figure 2:
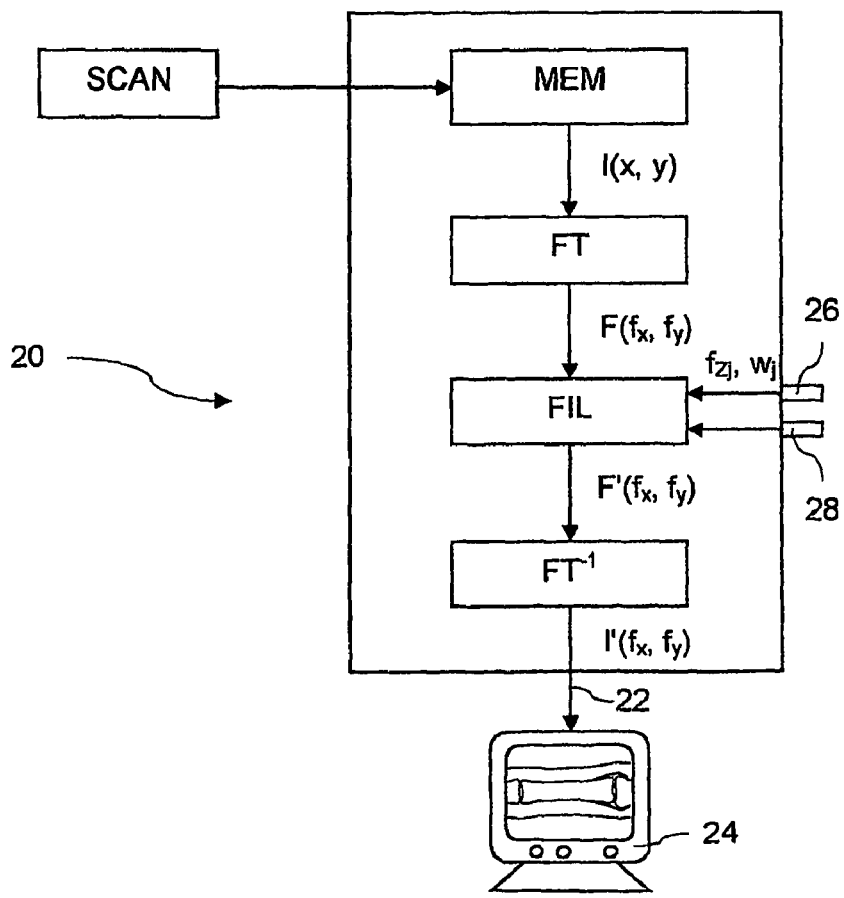
FIG. 2 shows a block diagram of an image processing device according to the invention.

In order to improve the perceptibility of the soft tissue structures 18, the digitised X-ray image 10 is therefore prepared in an image processing device 20, the structure of which is shown in FIG. 2. The image processing device 20 comprises a memory MEM, in which the digital image data generated in a scanner SCAN can be stored. The digital image data give intensities I(x, y) for each image point P=(x, y), each image point P being encodable with 16 bits, for example, so that more than 65,000 brightness values can be distinguished.

The memory MEM is connected to a Fourier transformation unit FT, by which the digital image data read out from the memory MEM can be subjected to a Fourier transformation. The frequency-space intensity distribution $F(f_x, f_y)$ generated by the Fourier transformation unit FT is a complex function over the frequency space spanned by the coordinates $f_x$ and $f_y$, and, clearly, indicates an amplitude density spectrum.

The image processing device 20 furthermore comprises a filter unit FIL, by which the frequency-space intensity distribution $F(f_x, f_y)$ can be filtered so that the weighting of different frequency ranges is modified. This will be explained in more detail below with reference to FIGS. 3 to 6.

Lastly, the image processing device 20 comprises an inverse Fourier transformation unit $FT^{-1}$, which transforms the frequency-space intensity distribution $F'(f_x, f_y)$ filtered by the filter unit FIL back into the position space, so that a modified position-space intensity distribution I'(x, y) is obtained. A monitor 24, on which the modified position-space intensity distribution I'(x, y) can be displayed, may be connected to an output 22 of the image processing device 20.

The filtering of the frequency-space intensity distribution $F(f_x, f_y)$ in the filter unit will be explained in more detail below with the aid of FIGS. 3 to 6.

Figure 3:
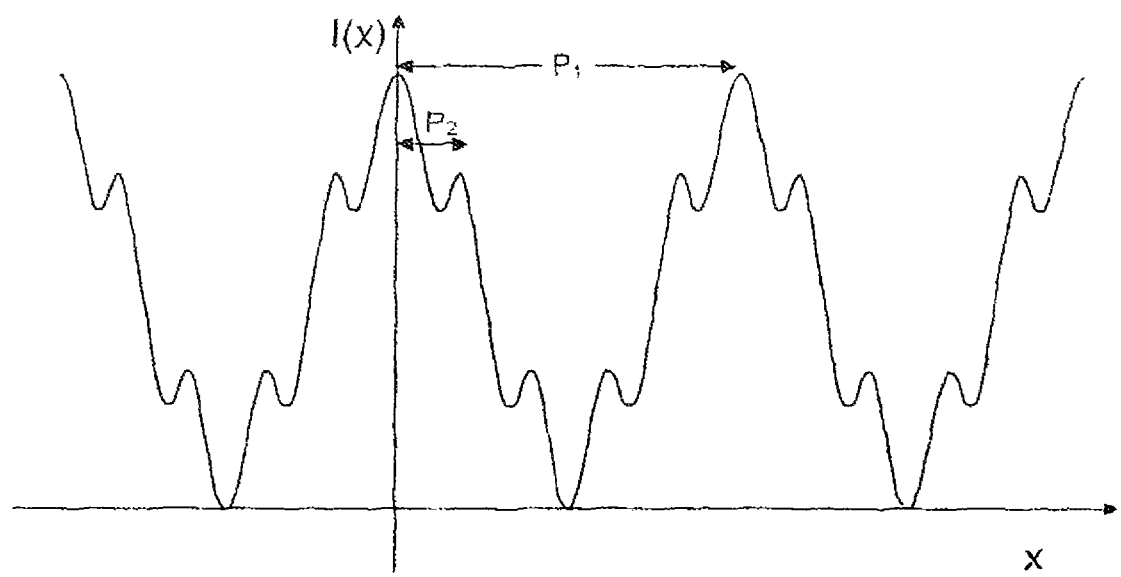
FIG. 3 shows a one-dimensional periodic position-space intensity distribution I(x)

FIG. 3 shows an intensity distribution I(x) for an image coordinate x in the position space, a periodic distribution being assumed for the sake of simplicity. The intensity distribution I(x) represents a superposition of a large-scale cosinusoidal intensity distribution of period $P_1$ with a small-scale cosinusoidal intensity distribution of period $P_2$. The large-scale intensity distribution in this simplified example is intended to reflect the shape—assumed to be cosinusoidal here—of the bones, while the small-scale intensity distribution represents the shape—likewise assumed to be cosinusoidal—of cosinusoidal soft tissue structures arranged thereon in the exposure direction, the characteristic dimensions of which are much smaller than those of the bones. One half period length, i.e. one wave crest of the cosine function, respectively corresponds to the characteristic structure size.

As can be seen in FIG. 3, against the relatively high signal level of the large-scale intensity distribution associated with the bone, the small-scale intensity distribution associated with the soft tissue structures fades into the background so that the relatively small fluctuations of the small-scale intensity distribution would be scarcely perceptible if the overall intensity distribution I(x) shown in FIG. 3 were to be displayed on a monitor.

Figure 4:
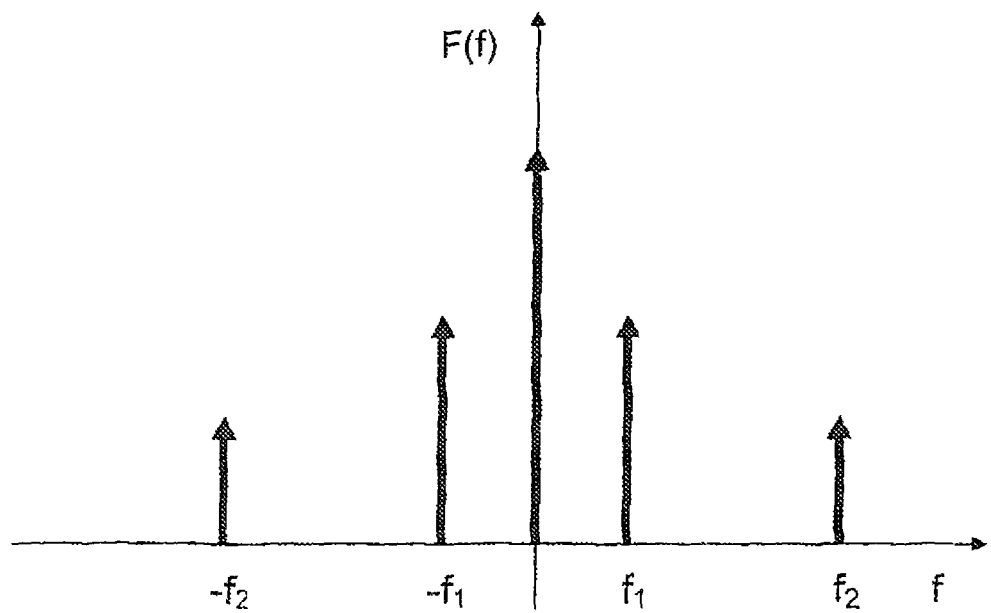
FIG. 4 shows the frequency-space intensity distribution F(f) for the position-space intensity distribution I(x) of FIG. 3.

FIG. 4 shows the frequency-space intensity distribution F(x) for the position-space intensity distribution I(x) shown in FIG. 3. Besides a contribution at the frequency f=0, reflecting a DC component of the intensity distribution I(x), the frequency-space intensity distribution F(f) also has a contribution with the value $f_1$ and a contribution with the value $f_2$, the lower frequency $f_1$ representing the large-scale component of the frequency-space intensity distribution and the higher frequency $f_2$ representing the small-scale component of the frequency-space intensity distribution.

Figure 5:
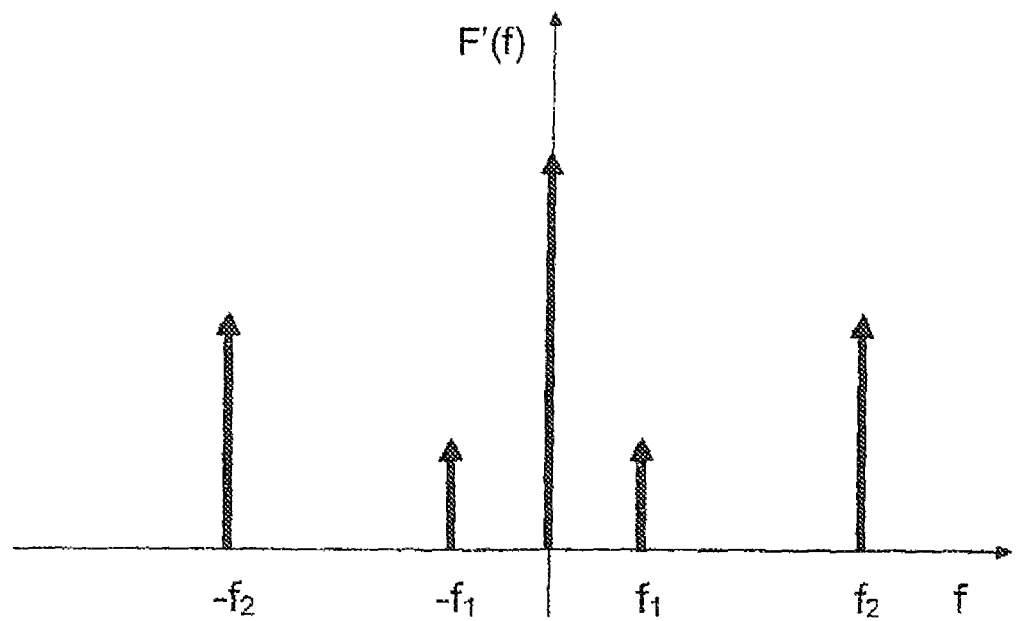
FIG. 5 shows a filtered frequency-space intensity distribution F'(f) generated by filtering the frequency-space intensity distribution F(f) shown in FIG. 4.

The filtering of the frequency-space intensity distribution F(f) is now carried out so that the amplitudes of the contributions at the frequency value $f_1$ are reduced and the amplitudes of the contributions at the frequency value $f_2$ are increased. This may, for example, be achieved by the following operations:

$$F'(f_1) = r_1 \cdot F(f_1) \text{ and}$$

$$F'(f_2) = r_2 \cdot F(f_2), \quad (1)$$

where $r_1$ and $r_2$ are gain factors with $r_1 < 1$ and $r_2 > 1$. The filtered frequency-space intensity distribution F'(f) obtained by the filtering is shown in FIG. 5. As can be seen from a comparison with FIG. 4, the weighting of the signal components at the frequency $f_1$ and of the signal components at the frequency $f_2$ has been modified in favour of the high-frequency image signal component at the frequency $f_2$.

Figure 6:
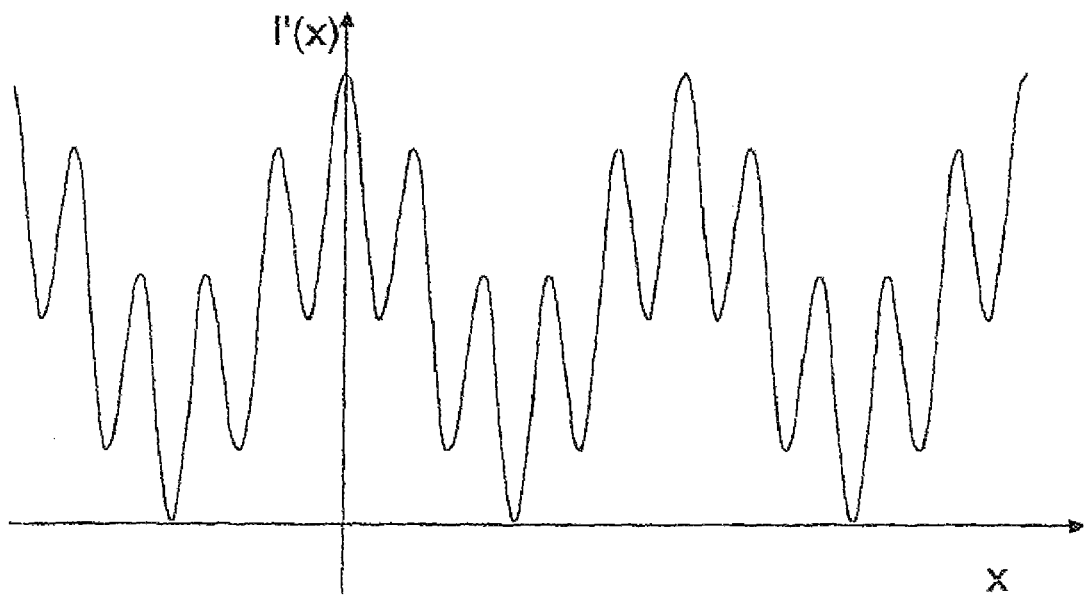
FIG. 6 shows a position-space intensity distribution I'(x) obtained by inverse Fourier transformation of the filtered frequency-space intensity distribution F'(f) shown in FIG. 5.

FIG. 6 shows the modified intensity distribution I'(x) which is obtained by inverse Fourier transformation from the filtered frequency-space intensity distribution F'(f). It can be seen clearly in the representation that the small-scale fluctuations of the intensity, which are intended to reflect the soft tissue structures, now have a larger amplitude then before the filtering and are therefore emphasised much better against the large-scale fluctuations which represent the bones.

Owing to its restriction to cosinusoidal structures in only one dimension, the example presented above represents a very rough simplification, but one which highlights the essence of the filtering particularly clearly. In real images, however, the imaged structures have within wide limits an arbitrary profile, so that the frequency-space intensity distribution obtained by Fourier transformation represents a continuous function in the frequency. If only the amplitudes of individual frequencies were then to be raised or lowered, as is the case in the example presented above, then this would have only an unnoticeable effect on the resulting filtered image.

For this reason, the weighting of the image signal components is preferably carried out not just for individual discrete frequencies, but for frequency bands. Each frequency band, whose weighting is intended to be modified, is set with the aid of a suitable profile function. A Gaussian function is particularly suitable as a profile function, since it has the property of retaining the shape of a Gaussian function even after the inverse Fourier transformation. Weighting the image signal components by multiplication of the frequency-space intensity distribution with a Gaussian function therefore corresponds in the position space to convolution of the intensity distribution I(x, y) with a Gaussian function. This in turn has the effect that positions where the intensity distribution changes abruptly, and which therefore have a particularly high contrast, do not diverge spatially after the filtering.

Figure 7:
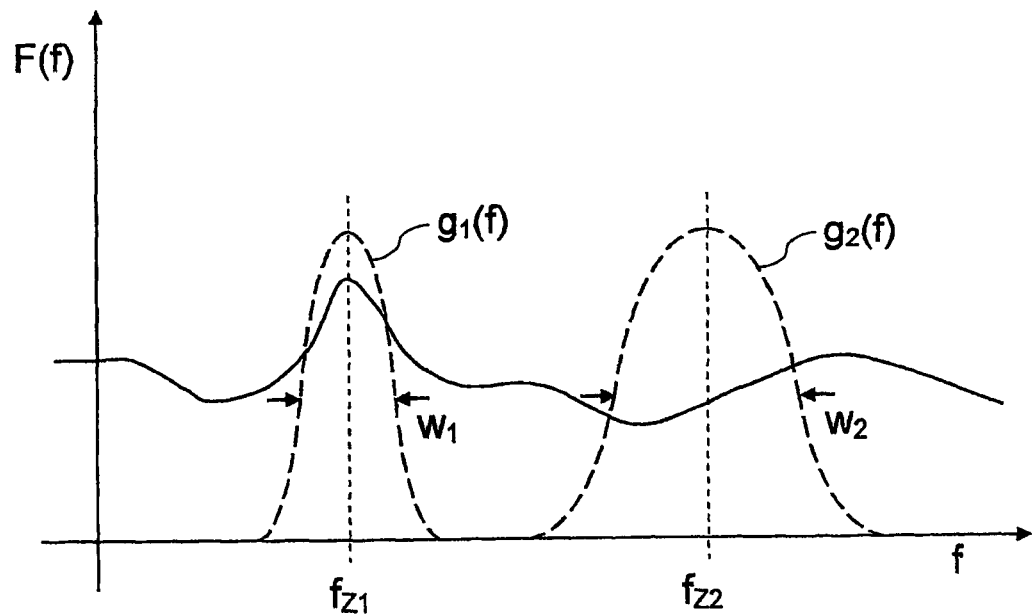
FIG. 7 shows a frequency-space intensity distribution F(f) for a one-dimensional position-space intensity distribution with two profile functions $g_1(f)$ and $g_2(f)$.

FIG. 7 shows the frequency-space intensity distribution F(f) for an arbitrary one-dimensional position-space intensity distribution, i.e. one not composed of cosinusoidal distributions. Dashes show a first profile function $g_1(f)$ and a second profile function $g_2(f)$, which in both cases are Gaussian functions given by the equation $$g_j(f) = \exp(-(f_{zj}-f)^2/2w_j^2) \quad (2)$$

with the central values $f_{z1}$ and $f_{z2}$ respectively, and the distances $w_1$ and $w_2$ respectively between the central value and the point of inflection. The distances $w_1$ and $w_2$ are a measure of the width of the bell-shaped profile functions $g_1(f)$ and $g_2(f)$. The effect of the filter in this example is that the Fourier amplitudes of frequencies which lie within the profile curve $g_1(f)$ lying around the central value $f_{z1}$ are reduced. Fourier amplitudes of frequencies which lie within the profile curve $g_2(f)$ lying around the central value $f_{z2}$, on the other hand, are raised.

Specifically, the filtering of the frequency-space intensity distribution F(f) in this case takes place according to the equation $$F'(f) = F(f) \cdot T_F(f) \quad (3)$$

where $T_F(f)$ is a filter function which is given by $$T_F(f) = (1 + r_1 g_1(f))(1 + r_2 \cdot g_2(f)) \quad (4)$$

The gain coefficients $r_1$ and $r_2$ in this case indicate how strongly the Fourier amplitudes within the frequency ranges specified by the profile functions are intended to be modified. In the example represented, $r_1$ is <0 since the Fourier amplitudes around $f_{z1}$ are to be reduced. For the gain coefficient $r_2$ on the other hand, $r_2$ is >0, which leads to an increase in the Fourier amplitudes.

Figure 8:
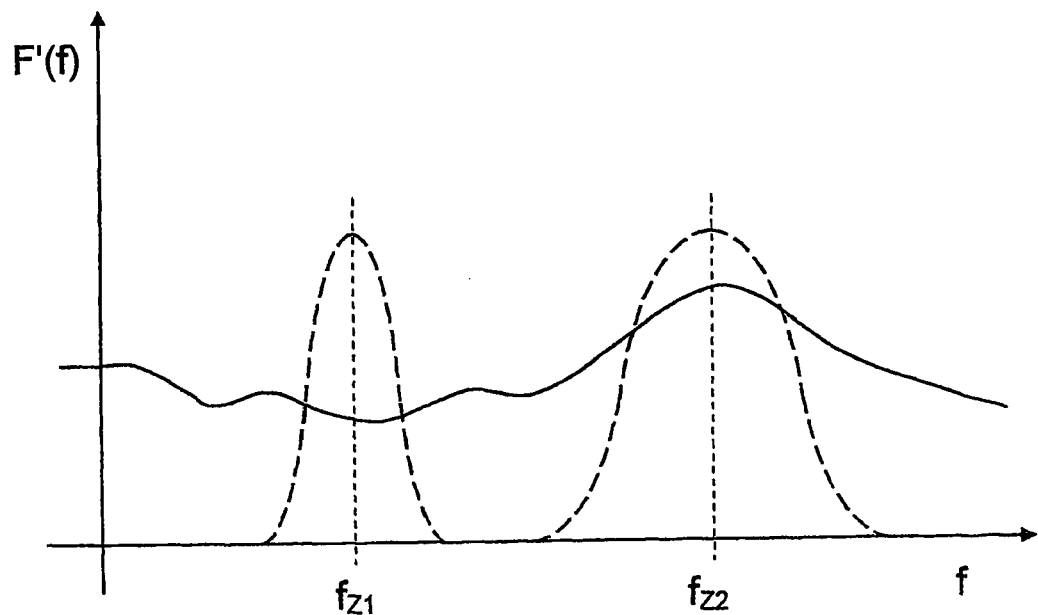
FIG. 8 shows a filtered frequency-space intensity distribution F'(f) obtained by filtering the frequency-space intensity distribution F(f) shown in FIG. 7.

The effects of the filtering represented in FIG. 7 on the frequency-space intensity distribution F(f) are shown in FIG. 8. Fourier amplitudes for frequencies which lie within the filter profiles $g_1(f)$ and $g_2(f)$ are respectively lowered and raised by filtering with the filter function $T_F(f)$. In this way, large-scale structures of the finger bones 14 stand back from small-scale structures such as the tendons 18 on the image shown on the monitor 24, so that the latter are more easily perceptible for a doctor.

It can be seen from Equations (2) to (4) that the filtering of the frequency-space intensity distribution F(f) with the aid of the profile functions in the example presented is determined by the value pairs $(f_{zj}, w_j)$. In the example explained above with the aid of FIGS. 3 to 6, the central values $f_{zj}$ are then also preferably to be selected so that the half period lengths corresponding to these frequencies $f_{zj}$ are approximately of the order of the dimensions of those structures which the filtering is intended to emphasise or attenuate in the image. If these typical structure sizes are the same for all conceivable applications, then the central values $f_{zj}$ as well as the profile widths $w_j$ may be set in advance in the image processing device 20. Preferably, however, these parameters are freely selectable by the doctor with the aid of interface elements 26, 28 provided on the image processing device 20, in order to improve the perceptibility of the soft tissue structures. Depending on the magnification, the type and arrangement of the bones and the type of soft tissue structures to be studied, on the other hand, the respective characteristic dimensions may be quite different so that adjustment during observation of the monitor 24 generally leads to the best results.

As an alternative to this, the image signal components whose weighting is to be modified may also be set automatically by the image processing device 20 via an adaptive method. To this end, a treating doctor needs to establish which soft tissue structures should be represented more perceptibly. For this purpose, the doctor preferably selects an edge region of the relevant soft tissue structure and marks it. A marking denoted by 30 is shown by way of example in FIG. 1, which the doctor may produce on a monitor being used to display the X-ray image 10, for example using a cursor, and which in the example presented comprises two points and a line 32 connecting them.

The image processing device 20 then carries out the aforementioned filtering for a multiplicity of frequency ranges, and respectively checks the extent to which the contrast is thereby improved along the line 32 between the points of the marking 30. The modified intensity distribution then displayed is the one obtained from that filtering with which the highest contrast was obtained.

In the examples described so far, it has been assumed that the Fourier amplitudes are increased by the filtering in only one frequency range and the Fourier amplitudes are reduced in only one frequency range. In order to improve the perceptibility, however, it is only the amplitude ratio which is important, so that in principle one of the said measures may even be sufficient for improving the perceptibility. On the other hand, it may be expedient to modify Fourier amplitudes in more than two frequency ranges, in order to achieve the desired improvement of the representation. For the index j in Equations (2), (3) and (4), this means that it may take not only the values 1 and 2, but also larger values.

$$T_F(f_x,f_y) = \Pi(1 \pm r_j \exp(-(f_{zj}-\sqrt{f_x^2+f_y^2})^2/2w_j^2)) \quad (3)$$

such that it will read, as amended, as follows:

$$T_F(f_x, f_y) = \prod_j \left(1 + r_j \cdot \exp\left(-\left(f_{zj} - \sqrt{f_x^2 + f_y^2}\right)^2 / 2w_j^2\right)\right) \quad (3)$$

Furthermore, the filter function $T_F(f_x, f_y)$ may also be multiplied by a further profile function in order to improve the signal-to-noise ratio. If this profile function is for example a Gaussian function with the central frequency $f_z=0$ and a width w, which corresponds to the frequency at which the high-frequency image signal component becomes lost in the noise, then the image signal components will be amplified relative to the background noise. This choice of the profile function compensates for the fact that the Fourier amplitudes decrease with an increasing frequency f in the images often to be represented in practice, so that a constantly present noise signal usually predominates at high frequencies.

It is to be understood that the above comments and explanations of an exemplary embodiment are merely examples, and in particular not restricted to improving the perceptibility of soft tissue structures. As mentioned in the introduction, not only can soft tissue structures be discriminated better from hard tissue structures such as bones in the manner described above, but also similar types of tissue structures can be discriminated better from one another so long as they differ from one another in their size.

It is to be understood that additional embodiments of the high-speed door assembly described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for improving the perceptibility of different structures on radiographs by using an image processing device, the method comprising the steps:
    a) storing a radiograph provided in electronic form as a position-space intensity distribution;
    b) carrying out a Fourier transformation in order to determine a frequency-space intensity distribution;
    c) filtering the frequency-space intensity distribution by modifying a weighting between high-frequency and low-frequency image signal components, wherein the image signal components to be weighted more strongly are set such that their corresponding position-space lengths are approximately twice as great as an average structure size of structures whose perceptibility is intended to be improved; and,
    d) carrying out an inverse Fourier transformation of the filtered frequency-space intensity distribution, so as to obtain a modified position-space intensity distribution in which these structures have a better perceptibility.

2. The method of claim 1, in which improving the perceptibility of the structures is done by increasing the contrast of the structures.

3. The method of claim 2, in which the filtered frequency-space intensity distribution $F'(f_x, f_y)$ is given by:

$$F'(f_x,f_y) = T_F(f_x,f_y) + (f_x,f_y)$$

where $F(f_x, f_y)$ is the frequency-space intensity distribution for the position-space intensity distribution, $f_x$, $f_y$ are frequencies in the two-dimensional frequency space and $T_F(f_x, f_y)$ is a filter function for the weighting of image signal components.

4. The method of claim 3, in which the filter function is set by at least one central frequency value and at least one profile function, which modifies the weighting of the image signal components as a function of the distance from the central frequency value.

5. The method of claim 4, in which the filter function $T_F(f_x, f_y)$ is given by $$T_F(f_x, f_y) = \prod_j (1 + r_j \cdot g(f_x, f_y, f_{zj}, w_j))$$

where $g(f_x, f_y, f_{zj}, w_j)$ is the profile function, $r_j$ is a weighting factor for the central frequency value $f_{zj}$ and $w_j$ is a width parameter, which is a measure of the width of the profile function.

6. The method of claim 5, in which the profile function $g(f_x, f_y, f_{zj}, w_j)$ is a Gaussian function given by $$g(f_x, f_y, f_{zj}, w_j) = \exp\left(-\left(f_{zj} - \sqrt{f_x^2 + f_y^2}\right)^2 / 2w_j^2\right).$$

7. The method of claim 4, in which the settings of at least one central frequency value and of the at least one profile function can be modified with the aid of control elements provided on the image processor.

8. The method of claim 4, in which after an operator has selected a structure whose perceptibility is intended to be improved on the radiograph, the at least one central frequency value and the at least one profile function are set adaptively so that the contrast of this structure is increased.

9. The method of claim 1, in which the filtered frequency-space intensity distribution $F'(f_x, f_y)$ is given by:

$$F'(f_x, f_y) = T_F(f_x, f_y) \cdot F(f_x, f_y)$$

where $F(f_x, f_y)$ is the frequency-space intensity distribution for the position-space intensity distribution, $f_x$, $f_y$ are frequencies in a two-dimensional frequency space and $T_F(f_x, f_y)$ is a filter function for the weighting of image signal components.

10. The method of claim 9, in which the filter function is set by at least one central frequency value and at least one profile function, which modifies the weighting of the image signal components as a function of the distance from the central frequency value.

11. The method of claim 10, in which the filter function $T_F(f_x, f_y)$ is given by $$T_F(f_x, f_y) = \prod_j (1 + r_j \cdot g(f_x, f_y, f_{zj}, w_j))$$

where $g(f_x, f_y, f_{zj}, w_j)$ is the profile function, $r_j$ is a weighting factor for the central frequency value $f_{zj}$ and $w_j$ is a width parameter, which is a measure of the width of the profile function.

12. The method of claim 11, in which the profile function $g(f_x, f_y, f_{zj}, w_j)$ is a Gaussian function given by $$g(f_x, f_y, f_{zj}, w_j) = \exp\left(-\left(f_{zj} - \sqrt{f_x^2 + f_y^2}\right)^2 / 2w_j^2\right).$$

13. The method of claim 10, in which the settings of at least one central frequency value and of the at least one profile function can be modified with the aid of control elements provided on the image processor.

14. The method of claim 10, in which after an operator has selected a structure whose perceptibility is intended to be improved on the radiograph, the at least one central frequency value and the at least one profile function are set adaptively so that the contrast of this structure is increased.

15. The method of claim 14, in which the structure is selected by specifying a point on the boundary of the structure and a direction, along which the contrast is intended to be increased.

16. The method of claim 14, in which the structure is selected by specifying two points within the structure, between which the contrast is intended to be increased.

17. The method of claim 1, in which the frequency-space intensity distribution $F(f_x, f_y)$ is also subjected to high-frequency filtering.

18. The method of claim 17, in which the high-frequency filter is given by a Gaussian filter with the central frequency value 0.

19. An image processing device for improving the perceptibility of different structures on radiographs, the image processing device comprising:
   a) a memory for storing a radiograph provided in electronic form as a position-space intensity distribution;
   b) a Fourier transformation unit for carrying out a Fourier transformation in order to determine a frequency-space intensity distribution;
   c) a filter for filtering the frequency-space intensity distribution by modifying the weighting between high-frequency and low-frequency image signal components, the image signal components to be weighted more strongly are set such that their corresponding position-space lengths are approximately twice as great as an average structure size of the structures whose perceptibility is intended to be improved;
   d) an inverse Fourier transformation unit for carrying out an inverse Fourier transformation of the filtered frequency-space intensity distribution, so as to obtain a modified position-space intensity distribution in which these structures are have a better perceptibility.

20. The image processing device of claim 19, in which improving the perceptibility of the structures is done by increasing the contrast of the structures.

* * * * *

UNITED STATES PATENT AND TRADEMARK OFFICE
CERTIFICATE OF CORRECTION

| | | |
|---|---|---|
| PATENT NO. | : 8,244,019 B2 | Page 1 of 1 |
| APPLICATION NO. | : 11/658630 | |
| DATED | : August 14, 2012 | |
| INVENTOR(S) | : Michael Thoms | |

It is certified that error appears in the above-identified patent and that said Letters Patent is hereby corrected as shown below:

Col. 8, line 48    The "+" should be deleted and -- •F -- should be inserted.

Signed and Sealed this
Sixth Day of November, 2012

David J. Kappos
*Director of the United States Patent and Trademark Office*